United States Patent
Liu et al.

(10) Patent No.: US 12,291,432 B2
(45) Date of Patent: May 6, 2025

(54) MULTIFUNCTIONAL SUSPENSION DEVICE FOR MECHANICAL ENGINEERING

(71) Applicant: DEZHOU UNIVERSITY, Dezhou (CN)

(72) Inventors: Haorui Liu, Dezhou (CN); Juan Yang, Dezhou (CN); Shida Liu, Dezhou (CN); Changkun Zhang, Dezhou (CN); Yayu Chen, Dezhou (CN)

(73) Assignee: Dezhou University, Dezhou (CN)

( * ) Notice: Subject to any disclaimer, the term of this patent is extended or adjusted under 35 U.S.C. 154(b) by 418 days.

(21) Appl. No.: 17/859,552

(22) Filed: Jul. 7, 2022

(65) Prior Publication Data
US 2024/0010470 A1    Jan. 11, 2024

(51) Int. Cl.
*B66C 1/28* (2006.01)
*B66C 1/42* (2006.01)
*F16L 3/133* (2006.01)

(52) U.S. Cl.
CPC .............. *B66C 1/28* (2013.01); *B66C 1/425* (2013.01); *F16L 3/133* (2013.01)

(58) Field of Classification Search
CPC .. B66D 1/14; B66C 1/28; B66C 1/425; B66C 1/62; F16L 3/133
See application file for complete search history.

(56) References Cited

U.S. PATENT DOCUMENTS

| 2005/0092116 A1* | 5/2005 | Pachov | B66D 1/14 |
| | | | 74/425 |
| 2012/0118208 A1* | 5/2012 | Kim | B66D 1/39 |
| | | | 254/331 |

FOREIGN PATENT DOCUMENTS

| CN | 205187743 U | * | 4/2016 | ................. B66F 3/44 |
| CN | 108163700 A | * | 6/2018 | ............. B66C 1/425 |
| CN | 112408176 A | * | 2/2021 | ............... B66C 1/12 |
| CN | 114162729 A | * | 3/2022 | ............... B66C 1/34 |

* cited by examiner

*Primary Examiner* — Sang K Kim
*Assistant Examiner* — Nathaniel L Adams
(74) *Attorney, Agent, or Firm* — The Dobrusin Law Firm, P.C.

(57) ABSTRACT

A multifunctional suspension device for mechanical engineering, relating to mechanical engineering equipment. The multifunctional suspension device includes a supporting base, wherein guide rods are symmetrically arranged on the left and right sides of the upper surface of the supporting base, the ends, away from the supporting base, of the guide rods are fixedly connected with a top plate, a first screw rod is arranged between the guide rods on the left and right sides, the upper and lower ends of the first screw rod are rotatably connected with the top plate and the supporting base, a first driving motor is arranged in the supporting base, second nuts drive arc-shaped clamps on the two sides to move inwards at the same time through push rods and clamping rods to clamp and fix a tubular part.

8 Claims, 4 Drawing Sheets

MULTIFUNCTIONAL SUSPENSION DEVICE FOR MECHANICAL ENGINEERING

TECHNICAL FIELD

The present disclosure relates to the technical field of mechanical engineering equipment, and specifically relates to a multifunctional suspension device for mechanical engineering.

BACKGROUND

Machinery is an important part of equipment industry. Machinery is mainly used in the fields of national defense construction engineering, transportation construction, energy industry construction and production, construction and production of raw material industries such as mines, agriculture, forestry and water conservancy construction, industrial and civil buildings, city construction, environmental protection and the like.

In the machining process of mechanical engineering, objects usually need to be transferred from low positions to high positions. Manual transportation is inconvenient, and safety accidents are easy to occur. The existing suspension lifting equipment for mechanical engineering is complex in structure, difficult in operation and extremely low in loading and unloading efficiency during transferring.

SUMMARY

The purpose of the present disclosure is to provide a multifunctional suspension device for mechanical engineering so as to solve the problem proposed in the background art.

In order to achieve the above purpose, the present disclosure provides the following technical scheme.

A multifunctional suspension device includes a supporting base, wherein guide rods are symmetrically arranged on the left and right sides of the upper surface of the supporting base, the ends, away from the supporting base, of the guide rods are fixedly connected with a top plate, a first screw rod is arranged between the guide rods on the left and right sides, the upper and lower ends of the first screw rod are rotatably connected with the top plate and the supporting base, a first driving motor is arranged in the supporting base, the output end of the first driving motor is fixedly connected with the first screw rod, a first nut is arranged on the surface of the first screw rod, limited rods are symmetrically arranged on the left and right sides of the upper surface of the supporting base, a moving seat is arranged on the surface of the limited rod, the moving seat is slidably connected with the limited rod, the moving seat is fixedly connected with a support plate, supports are symmetrically arranged on the left and right sides of the lower surface of the support plate, a worm is arranged between the supports on the left and right sides, the left and right ends of the worm are rotatably connected with the supports, the first nut is fixedly connected with the worms through rotating mechanisms, a worm gear is mounted below the worm, the worm gear is meshed with the worm, the worm gear is fixedly connected with a winding wheel, a pull rope is wound on the surface of the winding wheel, and the end, away from the winding wheel, of the pull rope is fixedly connected with a clamp.

As further scheme of the present disclosure, sliding seats are symmetrically and fixedly mounted on the left and right sides of the first nut, and the sliding seat is slidably connected with the guide rod.

As further scheme of the present disclosure, the rotating mechanism includes a rack plate, the rack plates are symmetrically arranged on the left and right sides of the lower surface of the top plate, the ends, away from the top plate, of the rack plates are fixedly connected with the supporting base, the sliding seats on the left and right sides are rotatably connected with gears, the gear can be meshed plate with the rack plate, and the end, away from the sliding seat, of the gear penetrates through the support and extends to be fixedly connected with the worm through a connecting rod.

As further scheme of the present disclosure, a carrying plate can be fixedly mounted below the supports on the left and right sides, and the worm gear can be rotatably connected with the carrying plate.

As further scheme of the present disclosure, the clamp includes a mounting plate, the tail end of the bottom of the pull rope can be fixedly connected with the mounting plate, supporting columns are symmetrically arranged on the left and right sides of the mounting plate, the end, away from the mounting plate, of the supporting column can be fixedly connected with a clamp box, a second driving motor can be arranged on the lower surface of the mounting plate, a second screw rod can be arranged in the clamp box, the second screw rod can be rotatably connected with the clamp box, the output end of the second driving motor can be fixedly connected with the second screw rod, a second nut can be arranged on the surface of the second screw rod, the left and right ends of the second nut are movably connected with push rods, clamping rods are symmetrically arranged on the left and right sides of the bottom of the clamp box, the clamping rods are movably connected with the bottom of the clamp box, the end, away from the second nut, of the push rod can be movably connected with the clamping rod, and the tail end of the bottom of the clamping rod can be fixedly connected with an arc-shaped clamp.

As further scheme of the present disclosure, antiskid mats are arranged on the surfaces of the inner side walls of the arc-shaped clamps on the left and right sides.

As further scheme of the present disclosure, supporting legs are symmetrically arranged on the left and right sides of the lower surface of the supporting base, the end, away from the supporting base, of the supporting leg can be fixedly connected with an antiskid plate, hydraulic cylinders are symmetrically arranged on the left and right sides of the lower surface of the supporting base, the hydraulic cylinder can be connected with a telescopic rod, the end, away from the hydraulic cylinder, of the telescopic rod can be fixedly connected with a pushing seat, mounting rods are symmetrically arranged on the left and right sides of the lower surface of the supporting base, the lower part of the mounting rod can be movably connected with a moving rod, a universal wheel can be mounted below the moving rod, the pushing seat can be movably connected with a carrying rod, and the end, away from the pushing seat, of the carrying plate can be movably connected with the moving rod.

As further scheme of the present disclosure, limited slots are symmetrically arranged on the left and right sides of the lower surface of the supporting base, the upper part of the pushing seat can be fixedly connected with a limited seat, and the limited seat can be slidably connected with the limited slot.

Compared with the prior art, the multifunctional suspension device provided herein has the beneficial effects that the second nuts drive the arc-shaped clamps on the two sides to move inwards at the same time through the push rods and the clamping rods to clamp and fix a tubular part, the first driving motor drives the first screw rod to rotate, the first nut drives the clamps to move up and down in the vertical direction through the rotating mechanisms, primary lifting of an object can be achieved, in the process that the first nut lifts up and down in the vertical direction, the gear can be meshed with the rack plate to drive the worm to rotate, the worm drives the winding wheel to rotate through the worm gear, and the winding wheel lifts the object below again through the pull rope, so that the operation can be more convenient, and the mechanical engineering efficiency can be effectively improved.

Reference signs: 1, supporting base; 2, supporting leg; 3, antiskid plate; 4, first driving motor; 5, pull rope; 6, worm gear; 7, rack plate; 8, gear; 9, carrying plate; 10, support; 11, support plate; 12, worm; 13, moving seat; 14, limited rod; 15, first screw rod; 16, top plate; 17, sliding seat; 18, first nut; 19, guide rod; 20, mounting plate; 21, second driving motor; 22, clamp box; 23, second screw rod; 24, clamping rod; 25, second nut; 26, arc-shaped clamp; 27, antiskid mat; 28, push rod; 29, mounting rod; 30, moving rod; 31, universal wheel; 32, carrying rod; 33, pushing seat; 34, telescopic rod; 35, hydraulic cylinder; 36, limited slot; 37, limited seat; 38, winding wheel; and 39, supporting column.

DETAILED DESCRIPTION

The technical solutions in the embodiments of the present disclosure will be described below clearly and completely with reference to the accompanying drawings in the embodiments of the present disclosure. Apparently, the described embodiments are merely some rather than all of the embodiments of the present disclosure. All other embodiments derived from the embodiments of the present disclosure by a person of ordinary skill in the art without creative efforts shall fall within the protection scope of the present disclosure.

Methods and systems for global stabilization control of a hypersonic vehicle that enable the global stabilization control of a non-minimum phase hypersonic vehicle are provided herein. To make the objective, features, and advantages of the present disclosure clearer and more comprehensible, the present disclosure will be further described in detail below in conjunction with the accompanying drawings and specific embodiments.

The following clearly and more completely describes the technical solution in the embodiments of the present disclosure in combination with the accompanying drawings of the embodiments of the present disclosure. Apparently, the described embodiments are only part of the embodiments of the present disclosure, not all embodiments. Based on the embodiments in the present disclosure, all other embodiments obtained by those of ordinary skill in the art without creative work shall fall within the protection scope of the present disclosure.

The technical scheme of the present disclosure is further described in detail below with reference to the detailed description.

Figure 1:
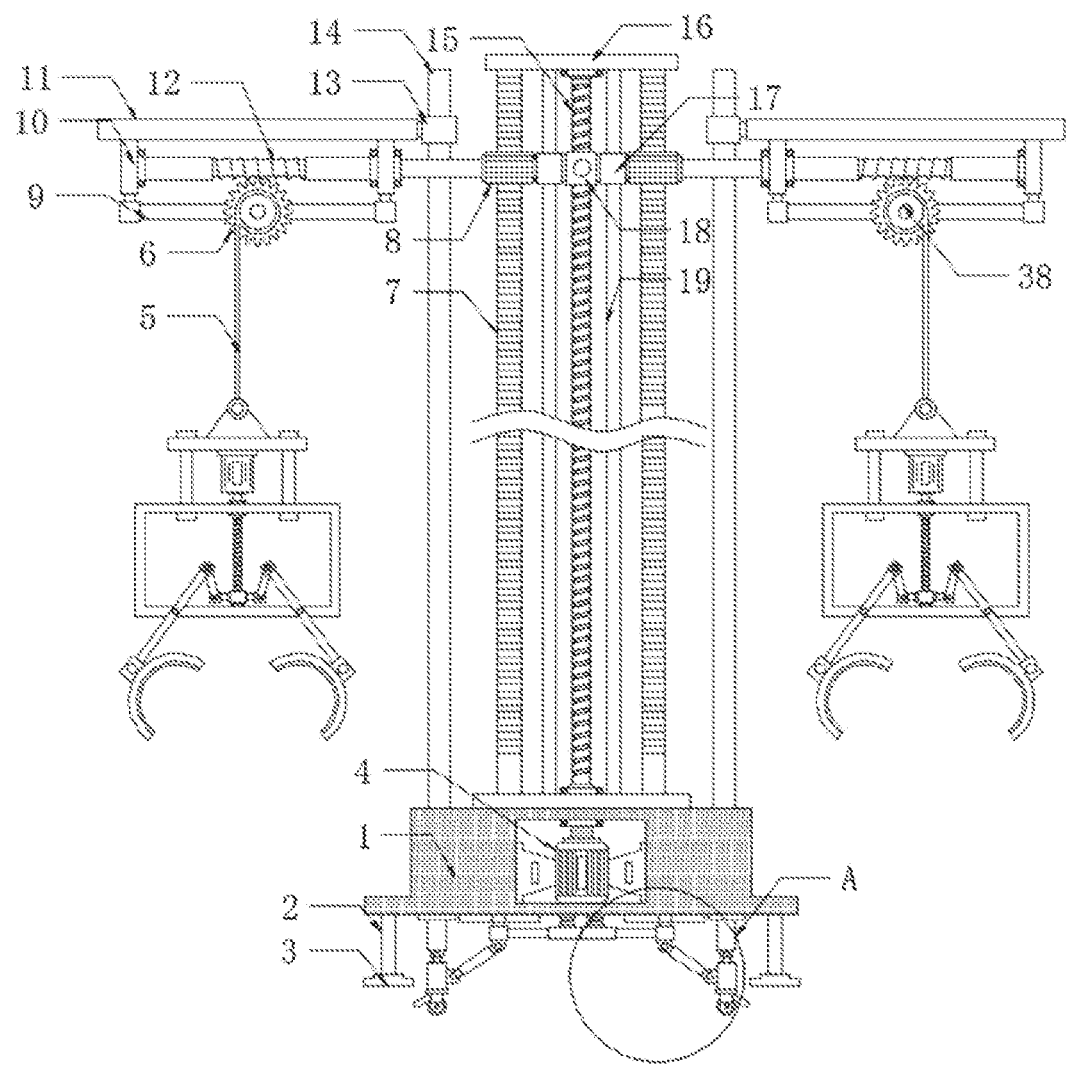
FIG. 1 is a structural schematic diagram of a multifunctional suspension device, according to one or more embodiments described herein.
Figure 2:
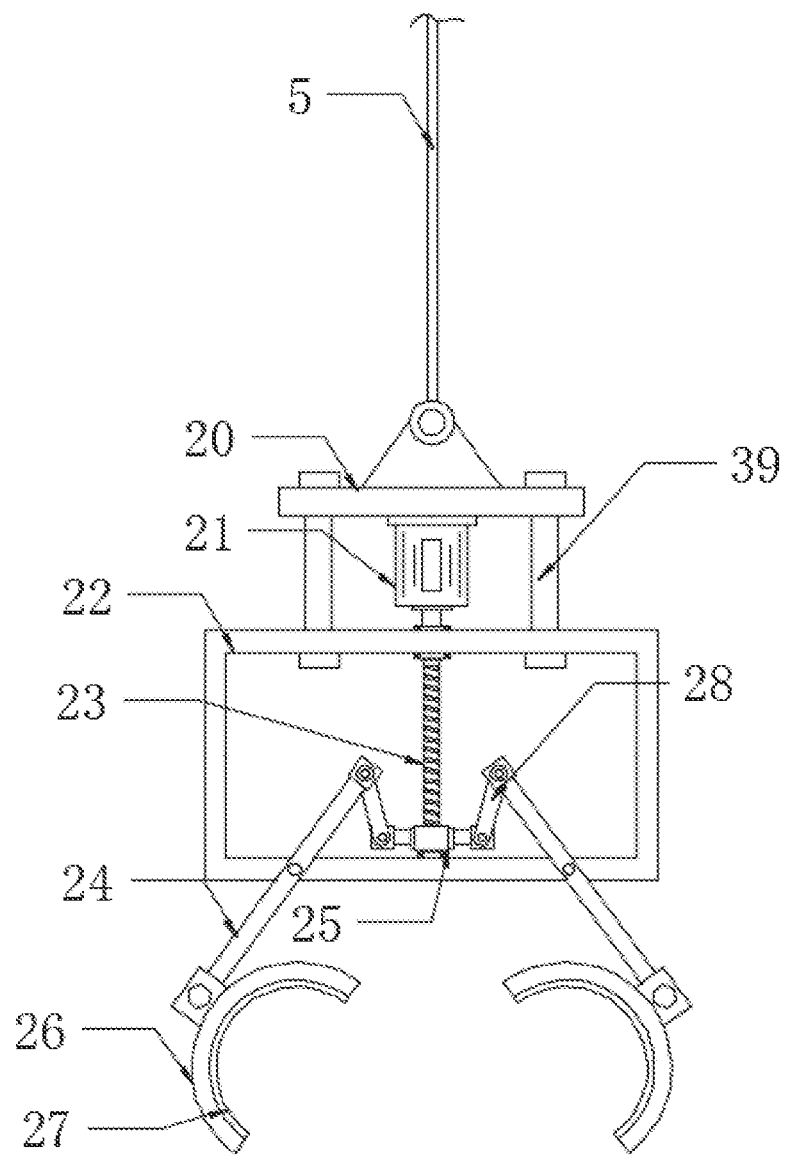
FIG. 2 is a structural schematic diagram of a clamp in a multifunctional suspension device, according to one or more embodiments described herein.
Figure 3:
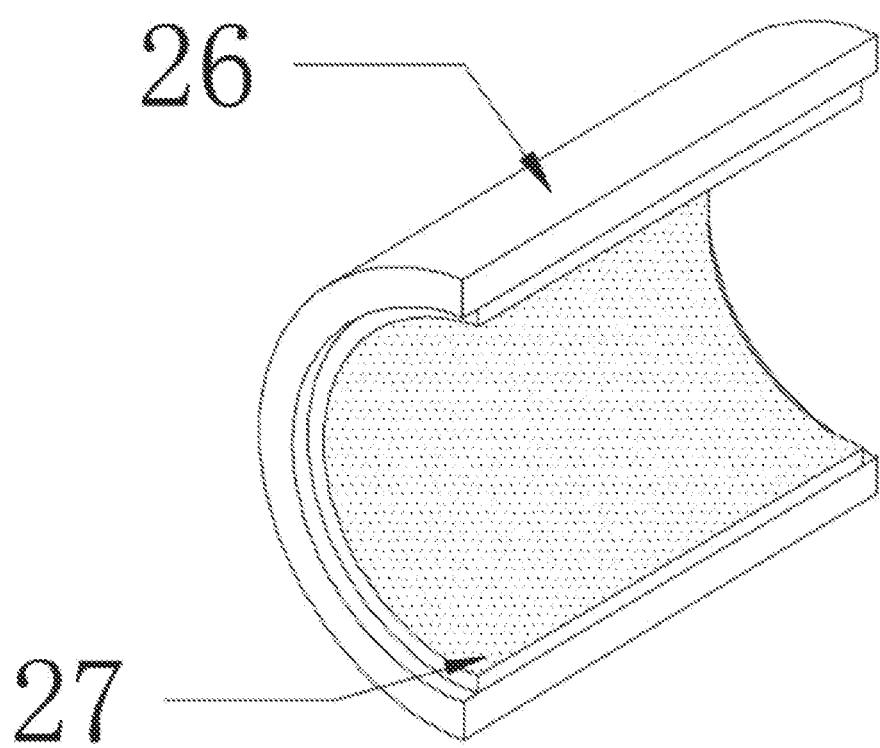
FIG. 3 is a structural schematic diagram of an arc-shaped clamp in a multifunctional suspension device, according to one or more embodiments described herein.
Figure 4:
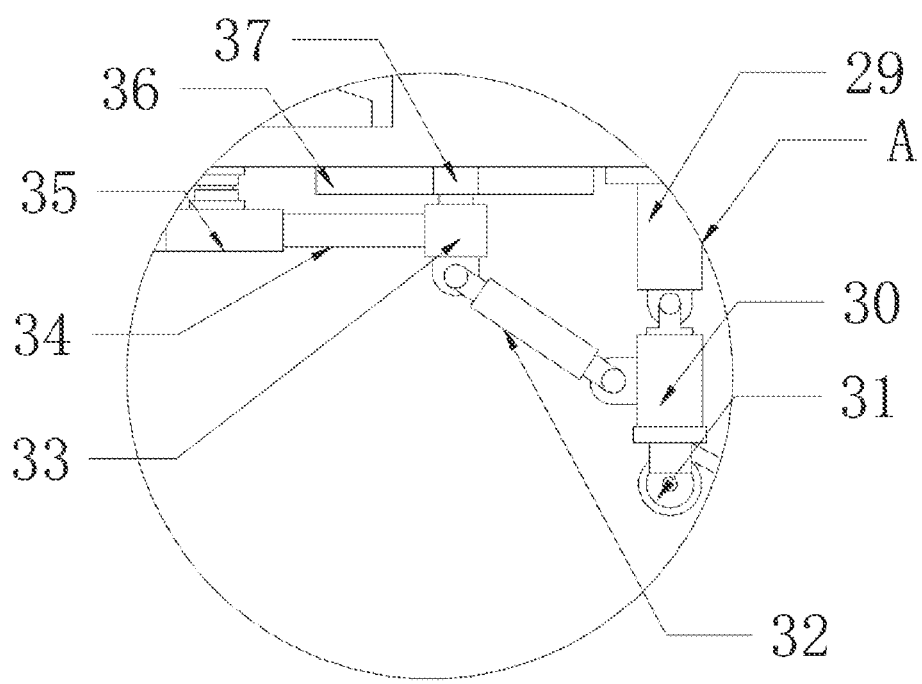
FIG. 4 is an amplified structural schematic diagram of part A in a multifunctional suspension device, according to one or more embodiments described herein.

Referring to FIG. 1 to FIG. 3, the multifunctional suspension device includes a supporting base 1, wherein guide rods 19 are symmetrically arranged on the left and right sides of the surface of the supporting base 1, the ends, away from the supporting base 1, of the guide rods are fixedly connected with a top plate 16, a first screw rod 15 can be arranged between the guide rods 19 on the left and right sides, the upper and lower ends of the first screw rod 15 are rotatably connected with the top plate 16 and the supporting base 1, a first driving motor 4 can be arranged in the supporting base 1, the output end of the first driving motor 4 can be fixedly connected with the first screw rod 15, a first nut 18 can be arranged on the surface of the first screw rod 15, limited rods 14 are symmetrically arranged on the left and right sides of the upper surface of the supporting base 1, a moving seat 13 can be arranged on the surface of the limited rod 14, the moving seat 13 can be slidably connected with the limited rod 14, the moving seat 13 can be fixedly connected with a support plate 11, supports 10 are symmetrically arranged on the left and right sides of the lower surface of the support plate 11, a worm 12 can be arranged between the supports 10 on the left and right sides, the left and right ends of the worm 12 are rotatably connected with the supports 10, the first nut 18 can be fixedly connected with the worms 12 through rotating mechanisms, a worm gear 6 can be mounted below the worm 12, the worm gear 6 can be meshed with the worm 12, the worm gear 6 can be fixedly connected with a winding wheel 38, a pull rope 5 can be wound on the surface of the winding wheel 38, and the end, away from the winding wheel 38, of the pull rope 5 can be fixedly connected with a clamp. The first driving motor 4 drives the first screw rod 15 to rotate, and a first nut 18 drives clamps to move up and down in the vertical direction through the rotating mechanisms, so that primary lifting of an object is achieved.

Further, in order to improve the stability of the first nut 18 moving up and down in the vertical direction, in the embodiment, sliding seats 17 are symmetrically and fixedly mounted on the left and right sides of the first nut 18, and the sliding seat 17 can be slidably connected with the guide rod 19.

Further, in order to improve the rotation of the worm 12 driven by the rotating mechanism, in the embodiment, the rotating mechanism includes a rack plate 7, the rack plates 7 are symmetrically arranged on the left and right sides of the lower surface of the top plate 16, the ends, away from the top plate 16, of the rack plates 7 are fixedly connected with the supporting base 1, the sliding seats 17 on the left and right sides are rotatably connected with gears 8, the gear 8 can be meshed plate with the rack plate 7, and the end, away from the sliding seat 17, of the gear 8 penetrates through the support 10 and extends to be fixedly connected with the worm 12 through a connecting rod. In the process that the first nut 18 lifts up and down in the vertical direction, the gear 8 can be meshed with the rack plate 7 to drive the worm 12 to rotate, the worm 12 drives the winding wheel 38 to rotate through the worm gear 6, and the winding wheel 38 lifts the object below through the pull rope 5.

Further, in order to mount and fix the worm gear 6, in the embodiment, a carrying plate 9 can be fixedly mounted below the supports 10 on the left and right sides, and the worm gear 6 can be rotatably connected with the carrying plate 9.

Further, in order to fix a tubular part through the clamp, in the embodiment, the clamp includes a mounting plate 20, the tail end of the bottom of the pull rope 5 can be fixedly connected with the mounting plate 20, supporting columns 39 are symmetrically arranged on the left and right sides of the mounting plate 20, the end, away from the mounting plate 20, of the supporting column 39 can be fixedly connected with a clamp box 22, a second driving motor 21 can be arranged on the lower surface of the mounting plate 20, a second screw rod 23 can be arranged in the clamp box 22, the second screw rod 23 can be rotatably connected with the clamp box 22, the output end of the second driving motor 21 can be fixedly connected with the second screw rod 23, a second nut 25 can be arranged on the surface of the second screw rod 23, the left and right ends of the second nut 25 are movably connected with push rods 28, clamping rods 24 are symmetrically arranged on the left and right sides of the bottom of the clamp box 22, the clamping rods 24 are movably connected with the bottom of the clamp box 22, the end, away from the second nut 25, of the push rod 28 can be movably connected with the clamping rod 24, and the tail end of the bottom of the clamping rod 24 can be fixedly connected with an arc-shaped clamp 26. The tubular part to be lifted can be arranged between the arc-shaped clamps 26 on the left and right sides, the second driving motor 21 drives the second screw rod 23 to rotate, and the second nuts 25 drive the arc-shaped clamps 26 on the two sides to move inwards at the same time through the push rods 28 and the clamping rods 24 to clamp and fix the tubular part.

Further, in order to increase the frictional force between the inner side wall of the arc-shaped clamp 26 and the tubular part, in the embodiment, antiskid mats 27 are arranged on the surfaces of the inner side walls of the arc-shaped clamps 26 on the left and right sides.

Referring to FIG. 1 to FIG. 4, on the basis of the embodiments described above, and in order to facilitate to move the device, supporting legs 2 are symmetrically arranged on the left and right sides of the lower surface of the supporting base 1, the end, away from the supporting base 1, of the supporting leg 2 can be fixedly connected with an antiskid plate 3, hydraulic cylinders 35 are symmetrically arranged on the left and right sides of the lower surface of the supporting base 1, the hydraulic cylinder 35 can be connected with a telescopic rod 34, the end, away from the hydraulic cylinder 35, of the telescopic rod 34 can be fixedly connected with a pushing seat 33, mounting rods 29 are symmetrically arranged on the left and right sides of the lower surface of the supporting base 1, the lower part of the mounting rod 29 can be movably connected with a moving rod 30, a universal wheel 31 can be mounted below the moving rod 30, the pushing seat 33 can be movably connected with a carrying rod 32, and the end, away from the pushing seat 33, of the carrying plate 32 can be movably connected with the moving rod 30. The hydraulic cylinder 35 drives the telescopic rod 34 to stretch and retract, and the telescopic rod 33 drives the moving rod 30 to rotate through the carrying rod 32, so that the universal wheel 31 can be in contact with or separated from the ground, and the device can be convenient to move.

Further, in order to improve the stability of the pushing seat 33 moving left and right in the horizontal direction, in the embodiment, limited slots 36 are symmetrically arranged on the left and right sides of the lower surface of the supporting base 1, the upper part of the pushing seat 33 can be fixedly connected with a limited seat 37, and the limited seat 37 can be slidably connected with the limited slot 36.

The working principle of the multifunctional suspension device provided herein includes the following: the tubular part to be lifted can be arranged between the arc-shaped clamps 26 on the left and right sides, the second driving motor 21 drives the second screw rod 23 to rotate, the second nuts 25 drive the arc-shaped clamps 26 on the two sides to move inwards at the same time through the push rods 28 and the clamping rods 24 to clamp and fix a tubular part, the first driving motor 4 drives the first screw rod 15 to rotate, the first nut 18 drives the clamps to move up and down in the vertical direction through the rotating mechanisms, primary lifting of an object is achieved, in the process that the first nut 18 lifts up and down in the vertical direction, the gear 8 can be meshed with the rack plate 7 to drive the worm 12 to rotate, the worm 12 drives the winding wheel 38 to rotate through the worm gear 6, and the winding wheel 38 lifts the object below again through the pull rope 5.

Only the preferred embodiments of the present disclosure have been described in detail above, but the present disclosure is not limited to the embodiments described above, and various changes may be made within the knowledge of those skilled in the art without departing from the spirit of the present disclosure.

The embodiments are described herein in a progressive manner. Each embodiment focuses on the difference from another embodiment, and the same and similar parts between the embodiments may refer to each other. Since the system disclosed in an embodiment corresponds to the method disclosed in another embodiment, the description is relatively simple, and reference can be made to the method description.

The principle and implementation modes of the present disclosure are described by applying specific examples in the present disclosure. The descriptions of the above embodiments are only intended to help to understand the method of the present disclosure and a core idea of the method. In addition, those ordinarily skilled in the art can make changes to the specific implementation modes and the application scope according to the idea of the present disclosure. From the above, the contents of this specification shall not be deemed as limitations to the present disclosure.

What is claimed is:
1. A multifunctional suspension device, comprising
   a supporting base having a surface with two sides,
   guide rods that are symmetrically arranged on the two sides of the surface of the supporting base, wherein ends, away from the supporting base, of the guide rods are fixedly connected with a top plate;
   a first screw rod that is arranged between the guide rods on left and right sides of the surface of the supporting base, the first screw rod having two ends that are rotatably connected with the top plate and the supporting base;
   a first driving motor that is arranged in the supporting base, wherein an output end of the first driving motor is fixedly connected with the first screw rod;
   a first nut that is arranged on a surface of the first screw rod;
   limited rods that are symmetrically arranged on the two sides of the surface of the supporting base, wherein a surface of each of the limited rods is provided with a moving seat, the moving seat is slidably connected with a corresponding one of the limited rods, the moving seat is fixedly connected with a support plate;

supports that are symmetrically arranged on two sides of a lower surface of the support plate;

a worm that is arranged between the supports on the two sides of the lower surface of the support plate, wherein two ends of the worm are rotatably connected with the supports, wherein the first nut is fixedly connected with the worm through a rotating mechanism, a worm gear is mounted at a bottom of the worm, the worm gear is meshed with the worm, the worm gear is fixedly connected with a winding wheel, a pull rope is wound on a surface of the winding wheel, and an end, away from the winding wheel, of the pull rope is fixedly connected with a clamp.

2. The multifunctional suspension device of claim 1, wherein sliding seats are symmetrically and fixedly mounted on the left and right sides of the first nut, and the sliding seat are separately and slidably connected with the guide rods.

3. The multifunctional suspension device of claim 2, wherein the rotating mechanism comprises rack plates that are symmetrically arranged on two sides of a lower surface of the top plate, wherein an end, away from the top plate, of each of the rack plates is fixedly connected with the supporting base, the sliding seats on the left and right sides of the first nut are rotatably connected with gears, wherein each of the gears is meshed with a corresponding one of the rack plates, and an end, away from a corresponding one of the sliding seats, of each of the gears penetrates through a corresponding one of the supports and extends to be fixedly connected with the worm through a connecting rod.

4. The multifunctional suspension device of claim 3, wherein a carrying plate is fixedly mounted below the supports on the left and right sides of the worm, and the worm gear is rotatably connected with the carrying plate.

5. The multifunctional suspension device of claim 4, wherein the clamp comprises a mounting plate, a tail end of a bottom of the pull rope is fixedly connected with the mounting plate, supporting columns are symmetrically arranged on two sides of the mounting plate; an end, away from the mounting plate, of each of the supporting columns is fixedly connected with a clamp box; a second driving motor is arranged on a lower surface of the mounting plate; a second screw rod is arranged in the clamp box, the second screw rod is rotatably connected with the clamp box; an output end of the second driving motor is fixedly connected with the second screw rod; a second nut is arranged on a surface of the second screw rod; left and right ends of the second nut are movably connected with push rods; clamping rods are symmetrically arranged on left and right sides of a bottom of the clamp box, the clamping rods are movably connected with the bottom of the clamp box an end, away from the second nut, of each of the push rods is movably connected with a corresponding one of the clamping rods, and a tail end of a bottom of each of the clamping rods is fixedly connected with an arc-shaped clamp.

6. The multifunctional suspension device of claim 5, wherein a surface of an inner side wall of the arc-shaped clamp on each of its left and right sides is provided with an antiskid mat.

7. The multifunctional suspension device of claim 6, wherein supporting legs are symmetrically arranged on left and right sides of the lower surface of the supporting bases, an end, away from the supporting base, of a corresponding one of the supporting legs is fixedly connected with an antiskid plate, hydraulic cylinders are symmetrically arranged on the left and right sides of the lower surface of the supporting base, each of the hydraulic cylinders is connected with a telescopic rod, an end, away from a corresponding one of the hydraulic cylinders, of the telescopic rod is fixedly connected with a pushing seat, mounting rods are symmetrically arranged on the left and right sides of the lower surface of the supporting base, a lower part of each of the mounting rods is movably connected with a moving rod, a universal wheel is mounted below the moving rod, the pushing seat is movably connected with a carrying rod, and an end, away from the pushing seat, of the carrying plate is movably connected with the moving rod.

8. The multifunctional suspension device of claim 7, wherein limited slots are symmetrically arranged on the left and right sides of the lower surface of the supporting base, an upper part of the pushing seat is fixedly connected with a limited seat, and the limited seat is slidably connected with a corresponding one of the limited slots.

\* \* \* \* \*